(12) United States Patent
Chen et al.

(10) Patent No.: US 11,656,864 B2
(45) Date of Patent: May 23, 2023

(54) AUTOMATIC APPLICATION OF SOFTWARE UPDATES TO CONTAINER IMAGES BASED ON DEPENDENCIES

(71) Applicant: INTERNATIONAL BUSINESS MACHINES CORPORATION, Armonk, NY (US)

(72) Inventors: Qin Yue Chen, Shanghai (CN); Xin Peng Liu, Beijing (CN); Han Su, Shanghai (CN); Fei Fei Li, Huang Pu (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,393

(22) Filed: Sep. 22, 2021

(65) Prior Publication Data
US 2023/0091915 A1    Mar. 23, 2023

(51) Int. Cl.
*G06F 8/658* (2018.01)
*G06F 8/61* (2018.01)
*G06F 8/41* (2018.01)
*G06F 11/07* (2006.01)
*G06F 11/14* (2006.01)
(Continued)

(52) U.S. Cl.
CPC .............. *G06F 8/658* (2018.02); *G06F 8/433* (2013.01); *G06F 8/63* (2013.01); *G06F 9/45558* (2013.01);
(Continued)

(58) Field of Classification Search
CPC . G06F 8/658; G06F 8/433; G06F 8/63; G06F 21/57
(Continued)

(56) References Cited

U.S. PATENT DOCUMENTS

| | | | |
|---|---|---|---|
| 7,779,401 B2 * | 8/2010 | Scian | G06F 8/65 717/168 |
| 2006/0047974 A1 * | 3/2006 | Alpern | H04L 67/34 726/26 |

(Continued)

FOREIGN PATENT DOCUMENTS

CN    111459530 A    7/2020

OTHER PUBLICATIONS

Hale, Jacks., et al. "Containers for portable, productive, and performant scientific computing." Computing in Science & Engineering 19.6 (2017): 40-50. (Year: 2017).*

(Continued)

*Primary Examiner* — Satish Rampuria
(74) *Attorney, Agent, or Firm* — Anthony Curro (57) ABSTRACT

Automatic application of software patches to software associated with container images based upon image relationships in a dependency tree. The computing device determines whether software associated with a base container image requires software patches. The computing device accesses dependency trees maintaining image relationships between the base container image and dependent container images. The computing device determines based upon the accessed one or more dependency trees whether the base container image has dependent container images derived from the base container image. The computing device applies software patches to the software associated with the base container image. The computing device rebuilds the base container image with the applied software patches. The computing device then rebuilds the dependent container images dependent upon the rebuilt base container image.

16 Claims, 8 Drawing Sheets

(51) Int. Cl.
    *G06F 9/455*     (2018.01)
    *G06F 21/57*     (2013.01)
(52) U.S. Cl.
    CPC ........ *G06F 11/0712* (2013.01); *G06F 11/142* (2013.01); *G06F 21/57* (2013.01); *G06F 2009/4557* (2013.01); *G06F 2009/45579* (2013.01); *G06F 2009/45587* (2013.01); *G06F 2201/815* (2013.01)
(58) Field of Classification Search
    USPC .................................................. 717/168–178
    See application file for complete search history.

(56) References Cited

U.S. PATENT DOCUMENTS

| | | | | |
|---|---|---|---|---|
| 2006/0080656 | A1* | 4/2006 | Cain | G06F 8/65 |
| | | | | 434/118 |
| 2009/0172636 | A1* | 7/2009 | Griffith | G06F 11/3664 |
| | | | | 717/113 |
| 2014/0173688 | A1* | 6/2014 | Fischer | H04L 9/3263 |
| | | | | 726/1 |
| 2019/0146772 | A1* | 5/2019 | Griffin | G06F 8/71 |
| | | | | 717/121 |
| 2020/0125352 | A1* | 4/2020 | Kannan | G06F 8/65 |
| 2020/0249928 | A1 | 8/2020 | Zeng | |

OTHER PUBLICATIONS

Vögler, Michael, et al. "A scalable framework for provisioning large-scale IoT deployments." ACM Transactions on Internet Technology (TOIT) 16.2 (2016): 1-20. (Year: 2016).*

Bellavista, Paolo, and Alessandro Zanni. "Feasibility of fog computing deployment based on docker containerization over raspberrypi." Proceedings of the 18th international conference on distributed computing and networking. 2017.pp. 1-10 (Year: 2017).*

Kästner, Christian, Klaus Ostermann, and Sebastian Erdweg. "A variability-aware module system." Proceedings of the ACM international conference on Object oriented programming systems languages and applications. 2012.pp. 773-791 (Year: 2012).*

Madhavapeddy, Anil, and David J. Scott. "Unikernels: Rise of the virtual library operating system: What if all the software layers in a virtual appliance were compiled within the same safe, high-level language framework?." Queue 11.11 (2013): pp. 30-44. (Year: 2013 ).*

Lauinger, Tobias, et al. "Thou shalt not depend on me: Analysing the use of outdated javascript libraries on the web." arXiv preprint arXiv:1811.00918 (2018).pp. 1-15 (Year: 2018).*

Github, "Containrrr / Watchtower—A Process for Automating Docker Container Base Image Updates," Github.com, Retrieved from the Internet, accessed May 6, 2021, 5 pages, <https://github.com/containrrr>.

Github, "Pyouroboros / Ouroboros—Automatically Update Running Docker Containers with Newest Available Image," Gibthub.com, Retrieved from the Internet, accessed May 6, 2021, 4 pages, <https://github.com/pyouroboros/ouroboros>.

Mell et al., "The NIST Definition of Cloud Computing," National Institute of Standards and Technology, Special Publication 800-145, Sep. 2011, pp. 1-7.

* cited by examiner

AUTOMATIC APPLICATION OF SOFTWARE UPDATES TO CONTAINER IMAGES BASED ON DEPENDENCIES

FIELD OF THE INVENTION

The present invention is directed towards the field of container images, and more specifically to automatic application of patches across associated container images according to a dependency tree and relationships between the container images.

BACKGROUND

The present embodiments relate to automatic application of software patches to software associated with various versions of container images. Container images are utilized in various operating system environments, including Docker®[1], Open Container Initiative®[1], AWS Lambda™[2], Kubernetes®[3], and others. All are contemplated in connection with the present disclosure, and known collectively as "container images" or "snapshots." Container images typically contain software including application code, libraries, tools, and dependencies in order to make an application which is to be deployed in a container associated with the container image(s) compile and/or run. Containers and associated container images present developers the advantage of consistency, easy deployment, security, and low resource usage to facilitate application development by providing standardized environments for development and testing of applications. Standardized application testing and development environments are particularly important in light of today's highly sophisticated software applications. As these applications become increasingly complicated, small changes to application code, libraries, tools, etc. in container images and associated containers the application being developed rely upon, can result in instability, crashing, and unexpected results.

[1] Open Container Initiative, Open Container Image, and Open Container Format are trademarks or registered trademarks of The Linux Foundation in the United States and/or other countries.
[2] AWS Lambda is a trademark or registered trademark of Amazon Web Services, Inc. or affiliates in the United States and/or other countries.
[3] Kubernetes is a trademark or registered trademark of The Linux Foundation in the Unites States and/or other countries.

Containers built based upon container images for development and testing of applications present challenges, however, particularly if software updates need to be rolled out to one or more containers built from a hierarchy of container images where one or more dependent container images are derived from a base container image. In situations where software updates need to be transmitted to a "base container image," which other "dependent container images" are derived from, if the one or more of dependent container images have been generated at different times, the software versions and patches (including the application code, libraries, tools, dependencies, etc.) associated with the base container image may be different than those associated with the dependent container images, and thus, if a patch or software update is applied to the base container image, it may cause crashing, instability issues, or some other execution or integration issue.

Presently disclosed embodiments of the invention offer a solution for avoiding the various technical errors that may occur with dependent container images, if the base container image is patched or updated, by automatically applying patches, software updates, or versioning (collectively, "software updates") to software associated with dependent container images according to a dependency tree.

SUMMARY

Embodiments include a method, a computer system, and a computer program product for automatic application of software updates to software associated with container images based upon container relationships in a dependency tree. A computing device determines whether software associated with a base container image requires one or more software patches. The computing device accesses one or more dependency trees maintaining image relationships between the base container image and one or more dependent container images. The computing device determines based upon the accessed one or more dependency trees whether the base container image has one or more dependent container images derived from the base container image. The computing device applies the one or more software patches to the software associated with the base container image. The computing device rebuilds the base container image with the applied one or more software patches. The computing device rebuilds the one or more dependent container images dependent upon the rebuilt base container image. If rebuilding by the computing device the one or ore dependent container images fails, the computing device restores the original one or more dependent container images and issues a warning to prevent a similar from occurring.

In an embodiment of the invention, the method, computer system, and computer program product determine whether the one or more software patches the base container image requires are compatible with the one or more dependent container images and, if so, the one or more dependent container images are rebuilt. When determining whether the one or more software patches are compatible with one or more dependent container images, the computing device checks whether the one or more software patches are compatible in a patch coverage table. The computing device may also check whether one or more incompatible patches were previously installed.

These and other features and advantages will become apparent from the following detailed description of the exemplary embodiment(s), taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

In response to these needs, the inventors propose a new invention for automatic application of software updates to container images based upon a relationship of dependencies between a base container image and one or more dependent container images derived from the base container image. As is understood by one of skill in the art, container images are utilized by software developers to generate stable environments for applications to execute, compile, etc. in an associated container. Containers are virtualized run-time environments for these applications built from container images. Container images, provide the necessary application code, libraries, tools, and dependencies for the associated container, but while the containers offer read-write privileges, container images are typically read-only.

Container images being read-only, therefore, are not directly modified, but are instead "built" or "rebuilt." In various embodiments of the invention, one container image is a "base container image" from which other "dependent container images" are formed, via a copy, partial copy, instantiation, etc. One or more of the "base container Image" and/or the "dependent container image" can be used by developers to generate a container for testing or development of an application. The various application code, libraries, tools, and dependencies from the associated container image are imported into the container. This serves to make a predictable virtualized run-time environment for testing of the application. When the developer desires to test an application in a slightly different environment, it is a simple matter to generate and utilize a new container image with the desired change to impart into a new container for further testing of the application.

The present invention offers a solution to situations where a base container image having one or more dependent container images requires a software update. Presently disclosed embodiments serve to automatically and consistently roll out the correct software update(s) to software associated with all dependent container images quickly and efficiently, allowing for system stability, the correct features being installed, etc. This provides the developer an opportunity to test applications across a variety of platforms predictably and seamlessly.

It will be readily understood that the components of the present embodiments, as generally described and illustrated in the Figures herein, may be arranged and designed in a wide variety of different configurations. Thus, the following detailed description of present embodiments of the invention is not intended to limit the scope of the embodiments, as claimed, but is merely representative of selected embodiments. It should be understood that the various embodiments may be combined with one another and that any one embodiment may be used to modify another embodiment.

References throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As shown and described herein, a technical solution to the technical problem of an application of patches to software associated with container images based upon image relationship in a dependency tree is provided by developing the system, computer program product, method, and other aspects described and/or illustrated herein.

Figure 1:
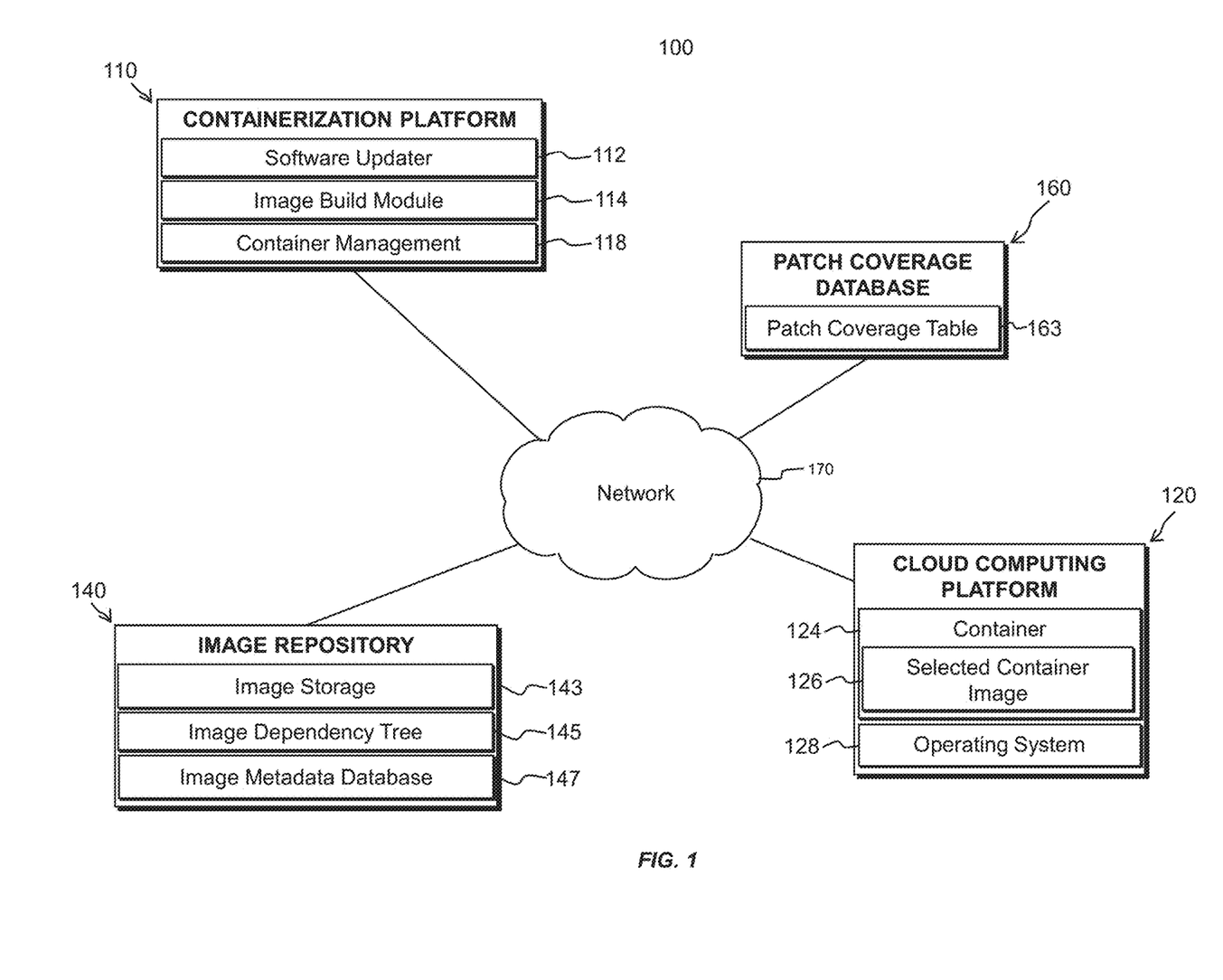
FIG. 1 depicts a schematic diagram of an environment 100 for automatic application of software updates to container images based upon dependencies, according to an embodiment of the invention.

Referring to FIG. 1, displayed is a schematic diagram of a environment 100 for automatic application of software updates to container images based upon dependencies, according to an embodiment of the invention. As shown in FIG. 1, containerization platform 110 is in functional communication with cloud computing platform 120, image repository 140, and patch coverage database 160 across a network 170. In various embodiments of the invention, however, network 170 may be replaced by communications fabric 918, such as displayed in FIG. 5. Any one or more of containerization platform 110, cloud computing platform 120, image repository 140, and patch coverage database 160 may be integrated into one physical computing device (or any number of physical computing devices associated with each), while maintaining the substance of the invention. Containerization platform 110 serves generally in the context of the presently disclosed embodiments to manage deployment of container images, and containers, as well as performing the necessary software updates, and other functionality as disclosed herein. Various functions performed by containerization platform 110 in the context of presently disclosed embodiments, include as an overview, determining whether software updating needs to be performed, communications with cloud computing platform 120, image repository 140, and patch coverage database 160 to obtain necessary data for application of software patches, as well as general management of one or more base container images and one or more dependent container images. Containerization platform 110 serves in various embodiments, to assist in deployment of container images and/or containers executing in a cloud computing platform 120. Cloud computing platform 120, in various embodiments of the invention makes available computer resources to host containers based upon container images managed by containerization platform 110, as one of skill in the art would understand. Containers hosted by cloud computing platform 120 are made available across network 170.

Continuing with regard to FIG. 1, image repository 140 stores various information regarding various container images, including the base container image(s) and dependent container image(s). The information stored by image repository 140 includes, for example an image dependency tree indicating one or more dependences between the base container image(s) and dependent container image(s). Patch coverage database 160 stores information regarding patches, software versions, and software updates applied to each container image for the purposes of maintaining information regarding compatibility between the patches, updates, etc. and deployed software. Containerization platform 110 accesses information regarding dependences from the image repository 140, as well as information from patch coverage database 160 to apply patches to the various container images, and then rebuild container images. Further details of various functionalities performed by containerization platform 110, cloud computing platform 120, image repository 140, and patch coverage database 160 are discussed herein.

Covering the various components of environment 100 in more depth, containerization platform 110 contains, in various embodiments of the invention, software updater 112, image build module 114, and container management 118.

Software updater 112 represents software and/or hardware associated with containerization platform 110 which performs various functionality in connection with container image software in the presently disclosed invention. In various embodiments, software updater 112 determines whether software associated with a base container image requires an update, such as one or more software patches (including, for example, security patches to improve the security of various software associated with container images). Software updater 112 communicates with patch coverage database 160 to determine whether the patches in question are compatible with previously installed software. Once a determination is made that software is to be updated and patches are compatible, software updater 112 applies the necessary software updates to the base container image(s). Necessary image building is performed by the image build module 114, as the base container image is rebuilt with the new software having necessary patches. In certain circumstances, patches rolled out by software updater 112 to container image(s) may include one or more symbiotic patches which must be installed together with other patches, or certain patches which must be installed in a certain order, etc. In other circumstances, certain patches should not be installed for various reasons such as incompatibility, such as when previously incompatible patches were installed. Patch coverage database 160 maintains such information, including information regarding information regarding symbiotic patches and otherwise. Software updater 112 may communicate with patch coverage database 160 to obtain such information, as required, and not update container images because of patch incompatibility issues, or update them with different software. In various embodiments of the invention, if software is updated (such as updated with mandatory security patches), software updater 112 tags an associated rebuilt container image with a mandatory update tag, and an update reason tag, which is stored in the patch coverage database 160. In various embodiments of the invention, rolling out software updates, software updater 112 may utilize a push update, a time-based check for updates, request updates by an application programming interface, request updates by user, etc.

Image build module 114 of containerization platform 110 represents software and/or hardware associated with containerization platform 110 for performance of various functionality with regard to the base container image(s) and dependent container image(s), in connection with embodiments of the presently disclosed invention. If software updates are applied to the base container image(s), after software updater 112 updates the software, image build module 114 rebuilds the base container image(s) (in various embodiments after determining by the software updater 112 whether the patches are compatible with the one or more dependent container images by checking via patch coverage database 160, as discussed elsewhere). In various embodiments of the invention, image build module 114 accesses one or more dependency trees maintaining image relationships between base container image(s) and one or more dependent container image(s). Image dependency trees are maintained by image repository 140, as further discussed herein. Image build module 114 determines, based on queries transmitted to image repository 140 and the accessed dependency trees whether the base container image(s) have one or more dependent container image(s) derived from them. This step is performed so as to determine whether or not it is necessary to have one or more dependent container images "re-built" with the newly updated software and software patches, since dependent container images cannot be updated directly with new software. If it is determined that there are one or more dependent container image dependent upon the base container image(s), image build module 114 first rebuilds the base container image(s), then rebuilds the one or more dependent container image(s) with the applied software patches, based upon the rebuilt base container image(s). In some circumstances, if a rebuild of dependent container image(s) fails, originals of the dependent container images are restored, and a warning is issued by image build module 114 to prevent a similar issue from occurring in the future. If the rebuild fails, image build module 114 notifies patch coverage database 160, which maintains information that the one or more patches are incompatible with one or more previous software patches.

In alternative embodiments of the invention, image build module 114 "rebuilding" of one or more dependent container images involves determining whether a pre-built and pre-stored dependent container image is stored in image storage 133, and, if so, rebuilding the dependent container image with the pre-stored dependent container image (with this functionality being performed, for example, to save computing resources, etc.). If not, image build module 114 builds a new image, to maintain compatibility with the patches.

Container management 118 of containerization platform 110 represents software and/or hardware associated with containerization platform 110 for management, deployment, and re-deployment of containers in cloud computing platform 120, with the containers in question built based on container images as discussed herein. In various embodiments of the invention, container images are deployed in container(s) 124 executing in cloud computing platform 120, with the containers 124 being lightweight, easily modifiable, and portable across platforms to best serve the needs of developers and users alike. The cloud computing platform 120 is discussed further herein. As container images are built and re-built, container management 118 requests that new containers 124 are built, re-built, updated, etc. based upon the new container images. The container images allow updated containers based on these container images to be easily and efficiently rolled out. As one or more base container image(s) and dependent container image(s) are updated, the newly updated container image(s) are deployed in new containers in cloud computing platform 120. The containers provide the advantage of allowing read-write access, while the container images themselves are read-only (and must, correspondingly, must be rebuilt to roll out newly updated software, as discussed elsewhere herein).

As also shown in FIG. 1, displayed is cloud computing platform 120, which contains container 124 built based upon selected container image 126. Also displayed is a common operating system 128 for container 124 (and any other containers 124 associated with cloud computing platform 120 (with other containers 124 not shown in FIG. 1)). Although only one cloud computing platform 120 is displayed in FIG. 1, also contemplated within the scope of the invention are a plurality of cloud computing platforms 120 each associated with container(s) 124, built based upon selected container image(s) 126 (also not shown in FIG. 1).

Container 124 represents software built based upon selected container image(s) 126 (which container images may include, in various embodiments, base container images and/or dependent container images, etc.). In various embodiments, more than one container 124 is contemplated, although only one is displayed in FIG. 1. As understood by one of skill in the art, containers 124 are a packaged unit of source code and necessary dependencies, libraries, objects, etc. which offer read-write access to allow developers and other users to access and use source code and other software within the containers 124. Containers 124 are built based upon selected container image(s) 126 (the container image(s) are read-only, and must be rebuilt, rather than modified, as discussed elsewhere herein). Each container 124 utilizes a common operating system 128 which is shared by one or more container(s) 124. Only one container 124 is displayed in FIG. 1 as associated with cloud computing platform 120, but also contemplated within the scope of the invention are multiple container(s) 124 executing on each cloud computing platform 120. As discussed elsewhere herein, when base container image(s) and or dependent container image(s) are re-built because of patching, container management 118 requests generation and/or modification of new container(s) 124 based upon the re-built container images. The newly generated or modified container 124, in such circumstances, is deployed in cloud computing platform 120.

Selected container image 126 represents base container image(s) or dependent container image(s) which container(s) 124 are built upon. As discussed elsewhere herein, when software updates are applied to base container image(s), by software updater 112, one or more dependent container image(s), which are dependent upon the base container image(s) may be rebuilt as well by image build module 114. When selected container image(s) 126 are rebuilt, container management 118 requests redeployment of new container(s) 124 based upon the new selected container image(s) 126.

Operating system 128 represents software for performance of low level system management, driver management, processor scheduling, resource management, and other basic functions for software executing in cloud computing platform 120, as understood by one of skill in the art. Each container 124 shares common operating system 128 associated with cloud computing platform 120.

Also shown in FIG. 1 is image repository 140, containing image storage 143, image dependency tree 145, and image metadata database 147.

Image storage 143 represents software and/or hardware for storage of base container image(s) and dependent container image(s). One or more versions of each container image may be stored in image storage 143, including previous versions for use such as in restoring older versions of container image(s), as required (such as because of failure of a new build). In various embodiments of the invention, if image build module 114 requests updating of software of a base container image or a dependent container image, image storage 143 accesses a pre-stored container image with the requested software version, rather than independently building one. Image storage 143, in alternative embodiments, may maintain pre-stored container images which are compatible with a base container image or a dependent container image, and which are provided, as requested, by image build module 114. If one is not available, image build module 114 may build a new one, and the newly built container image is stored in image storage 143 for use at a later time.

Image dependency tree 145 represents software/and hardware for maintaining image relationships between each base container image and one or more dependent container image(s). An example of image dependency tree 145 is provided in FIG. 2, and further discussed in connection with FIG. 2. Image build module 114 communicates with image dependency tree 145 as required to determine which dependent container image(s) are dependent upon base container image and derived from the base container image, and therefore also need to be rebuilt if a base container image has a patch installed and is rebuilt. This process is further discussed herein.

Image metadata database 147 represents software and/or hardware for storing of metadata associated with each container image, including base container images and dependent container images, as discussed herein. Image metadata stored in image metadata database 147 includes build date for each container image, software versions utilized, update tag(s), update reason tag(s) (i.e. why updates where made to container image(s) in the past, etc.). Other metadata associated with each container image is contemplated as well.

Finally, as shown with regard to FIG. 1, displayed is patch coverage database 160, which contains patch coverage table 163.

Patch coverage table 163 represents software and/or hardware for maintaining information regarding software patches associated with base container images and/or dependent container images. An example of a patch coverage table 163 is provided in FIG. 3, and further discussed in connection with FIG. 3. Patch coverage table 163, in various embodiments of the invention, maintains information regarding compatibility of software patches with various container images, whether patches are symbiotic with other patches, whether patches have to be installed in order, etc. In various embodiments of the invention, software updater 112 communicates with patch coverage table 163 to determine whether one or more patches are compatible before installing them, or whether previous patches were compatible.

Figure 2:
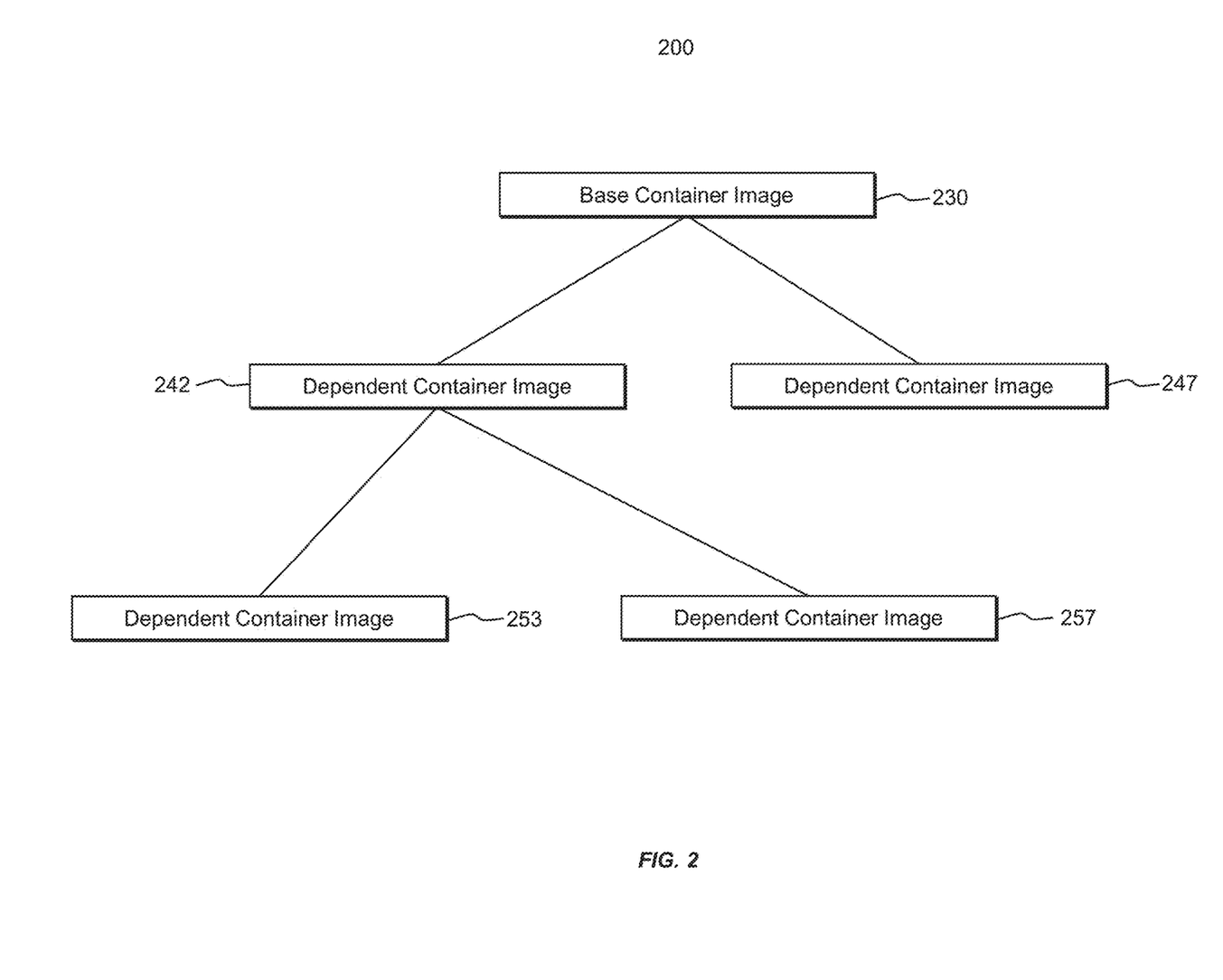
FIG. 2 depicts a block diagram illustrating a representation of a dependency tree 200 displaying dependencies between base container images and container images, according to an embodiment of the invention.

Referring to FIG. 2, displayed is a block diagram illustrating a representation of a dependency tree 200 displaying dependencies between base container image 230 and multiple dependent container image(s) 242, 247, 253, 257. In various embodiments of the invention, when software updater 112 determines that software associated with base container image 230 needs to be updated and base container image needs to be rebuilt, image build module 114 communicates with image dependency tree 145. Image dependency tree 200 maintains relationships such as displayed in dependency tree 200, and responds with one or more dependent container images 242, 247, 253, 257 which would also need to be rebuilt if base container image 230 is rebuilt. Image dependency tree 200 maintains these relationships for availability as discussed herein.

Figure 3:
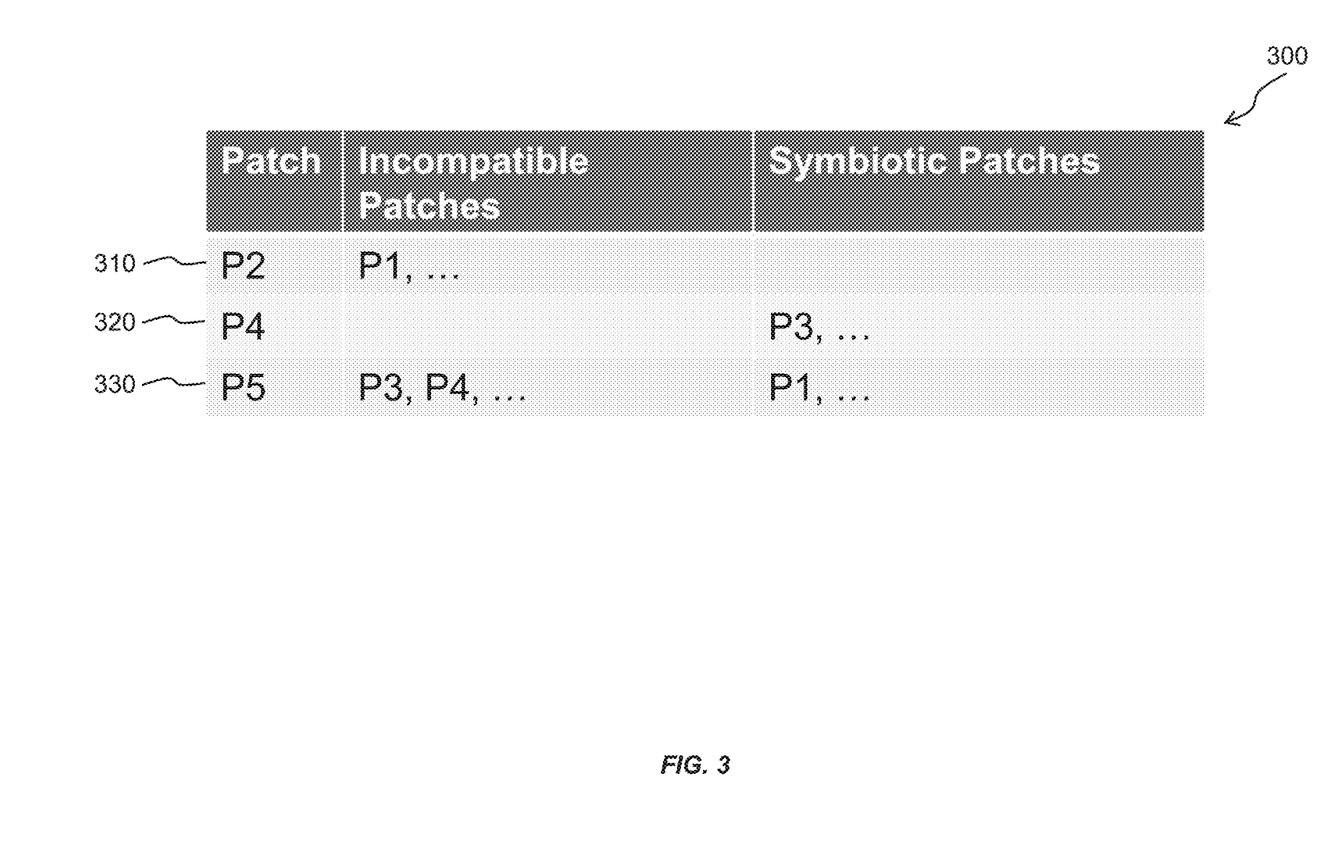
FIG. 3 depicts a chart illustrating a representation of a patch database 300, according to an embodiment of the invention.

Referring to FIG. 3, displayed is a chart illustrating a representation of a patch coverage database 300, according to an embodiment of the invention. In the displayed embodiment of the invention, patch coverage database 300 maintains information regarding compatibility of patch P2 310, patch P4 320, and patch P5 330, specifically which patches are incompatible with each of these patches and which patches are symbiotic with each of these patches 310, 320, 330. In various embodiments of the invention, when software updater 112 determines one or more container images need to be patched, software updater 112 communicates with patch coverage table 163 stored in patch coverage database 300 to determine whether patches are compatible, whether patches are symbiotic, whether multiple patches need to be installed in a certain order, etc. As would be understood by one of skill in the art, not every software patch to be deployed is compatible with every other version of software patches, and patch coverage database 300 stores the necessary information.

Figure 4A:
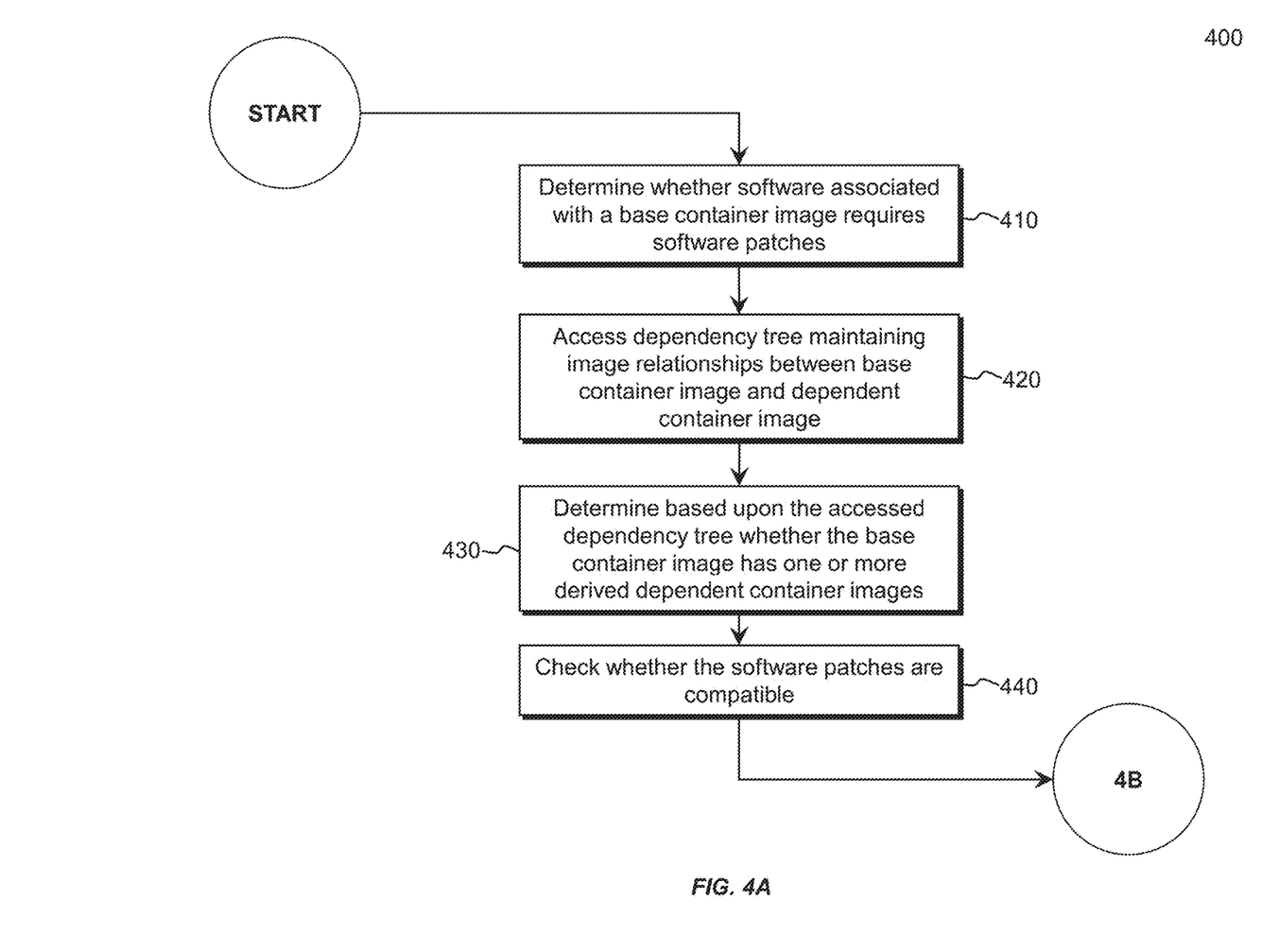
FIGS. 4A and 4B depicts a process flow chart 400 illustrating a process for automatic application of software updates to container images based upon dependencies, according to an embodiment of the invention.

Referring to FIG. 4A depicts a process flow chart 400 illustrating a process for automatic application of software updates to container images based upon dependencies, according to an embodiment of the invention.

At step 410, software updater 112 of containerization platform 110 determines whether software associated a base container image requires one or more software patches.

At step 420, image build module 114 of containerization platform 110 accesses one or more dependency trees 145 maintaining image relationships between a base container image and one or more dependent container images from image repository 140. An example of a dependency tree 200 is provided in connection with FIG. 2.

At step 430, image build module 114 determines based upon the accessed dependency tree 145 whether the base container image has one or more derived dependent container image(s) which are derived from the base container image.

At step 440 software updater 112 checks whether the software patches are compatible via communication with patch coverage table 163 of patch coverage database 160.

Figure 4B:
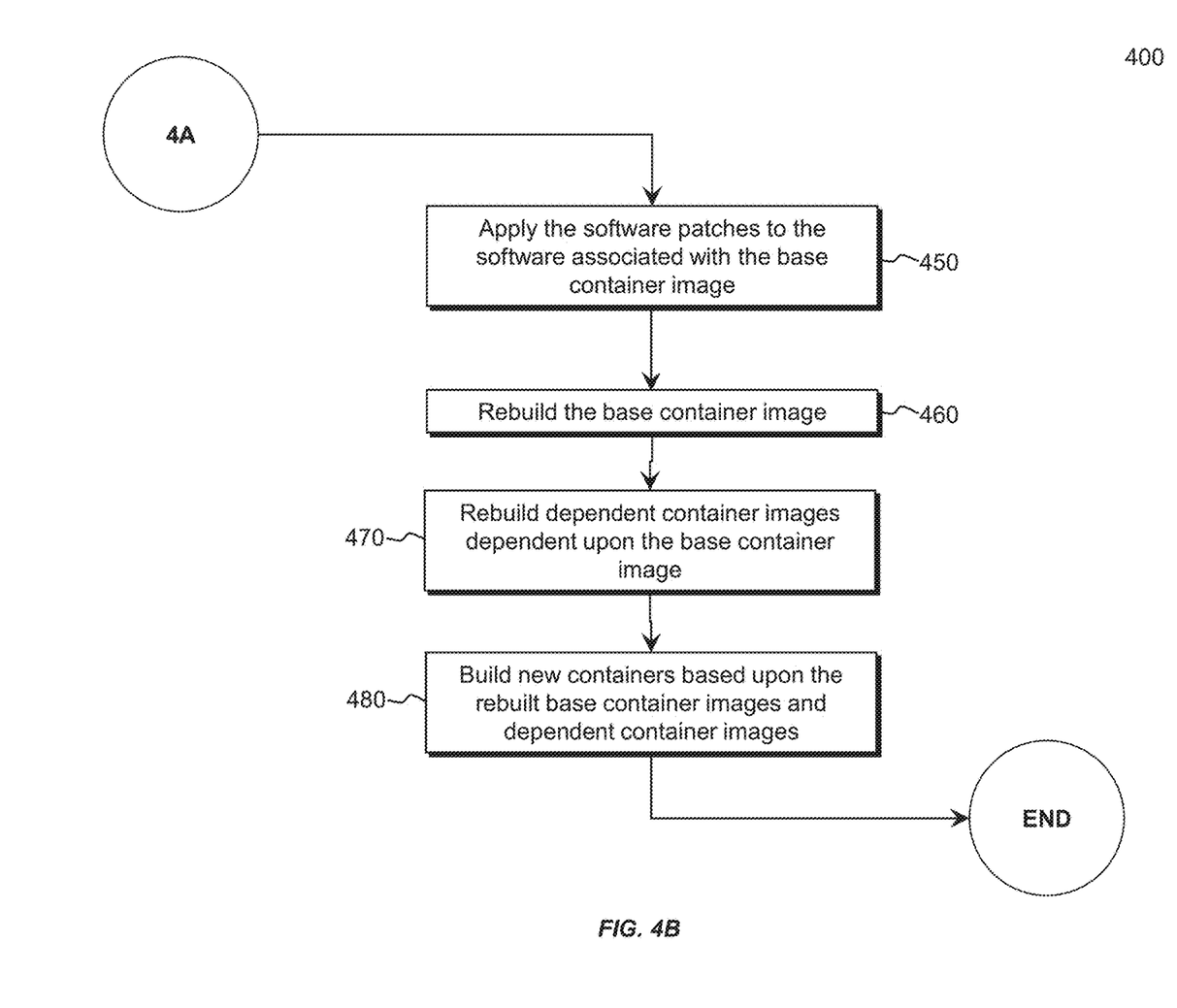

Continuing by referring to FIG. 4B, at step 450 software updater 112 applies one or more software patches to software associated with the base container image.

At step 460, image build module 114 rebuilds the base container image, now with the newly patched software.

At step 470, image build module 114 rebuilds one or more dependent container images dependent on the base container image. In various embodiments of the invention, newly rebuilt base container images and dependent container images are stored in image storage 143 of image repository 140.

At step 480, container management 118 of containerization platform 110 builds, or request building, of new containers based upon the rebuilt base container images and/or the dependent container images. These are deployed in cloud computing platform 120 as container(s) 124. Further details on this process discussed in FIGS. 4A and 4B are discussed in connection with selected embodiments as provided elsewhere herein.

Figure 5:
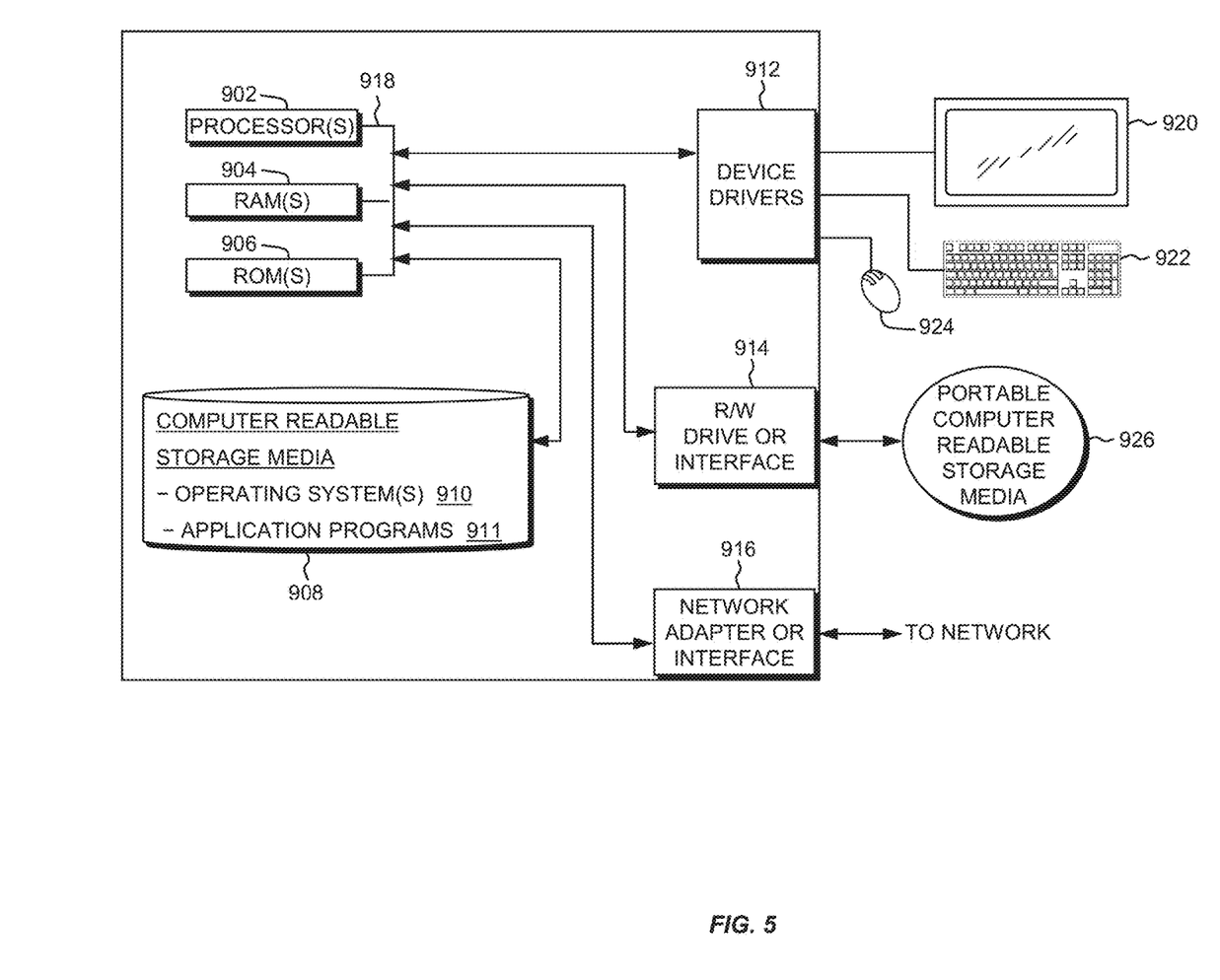
FIG. 5 depicts a block diagram illustrating components of FIG. 1, in accordance with an embodiment of the invention.

FIG. 5 depicts a block diagram of components of containerization platform 110, cloud computing platform 120, image repository 140, and patch coverage database 160 of the environment 100, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Containerization platform 110, cloud computing platform 120, image repository 140, and patch coverage database 160 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment for environment 100 for automatic application of software updates to container images based upon dependencies are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Containerization platform 110, cloud computing platform 120, image repository 140, and patch coverage database 160 may also include a R/W drive or interface 914 to read from and write to one or more portable computer readable storage media 926. Application programs 911 may be stored on one or more of the portable computer readable storage media 926, read via the respective R/W drive or interface 914 and loaded into the respective computer readable storage media 908.

Containerization platform 110, cloud computing platform 120, image repository 140, and patch coverage database 160 may also include a network adapter or interface 916, such as a TCP/IP adapter card or wireless communication adapter (such as a 4G wireless communication adapter using OFDMA technology). Application programs 911 on containerization platform 110, cloud computing platform 120, image repository 140, and patch coverage database 160 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Containerization platform 110, cloud computing platform 120, image repository 140, and patch coverage database 160 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
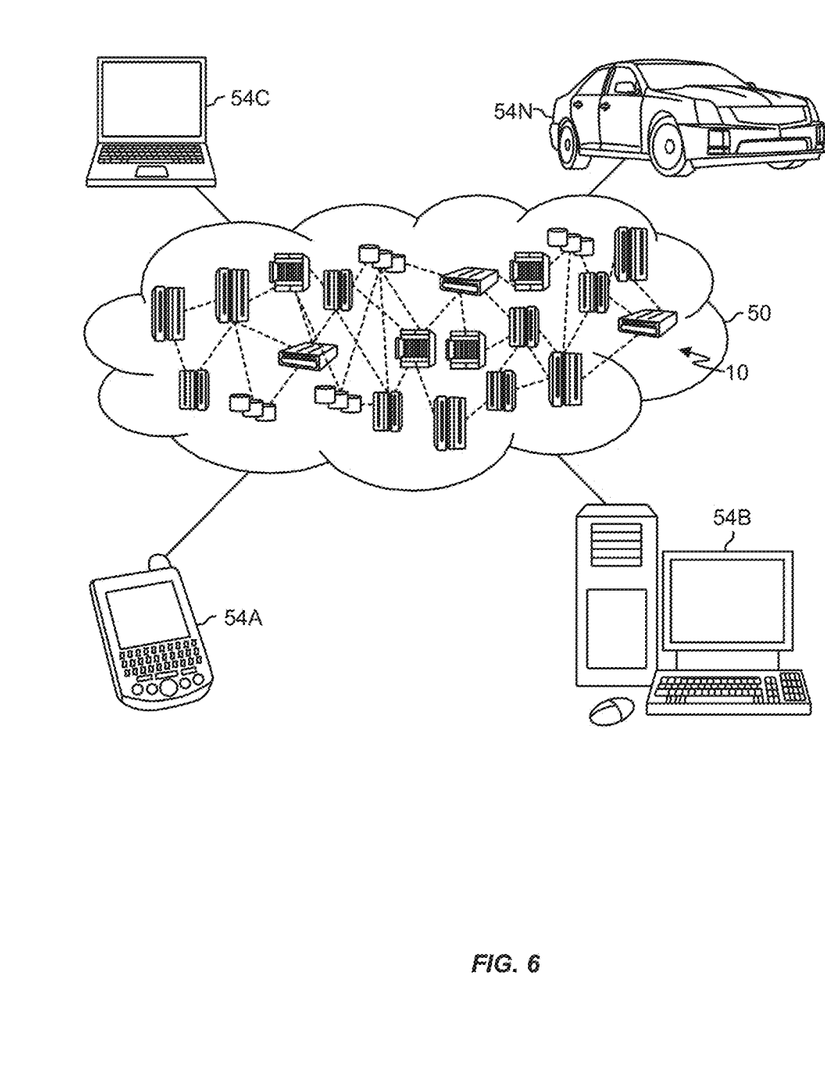
FIG. 6 depicts a cloud-computing environment, in accordance with an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
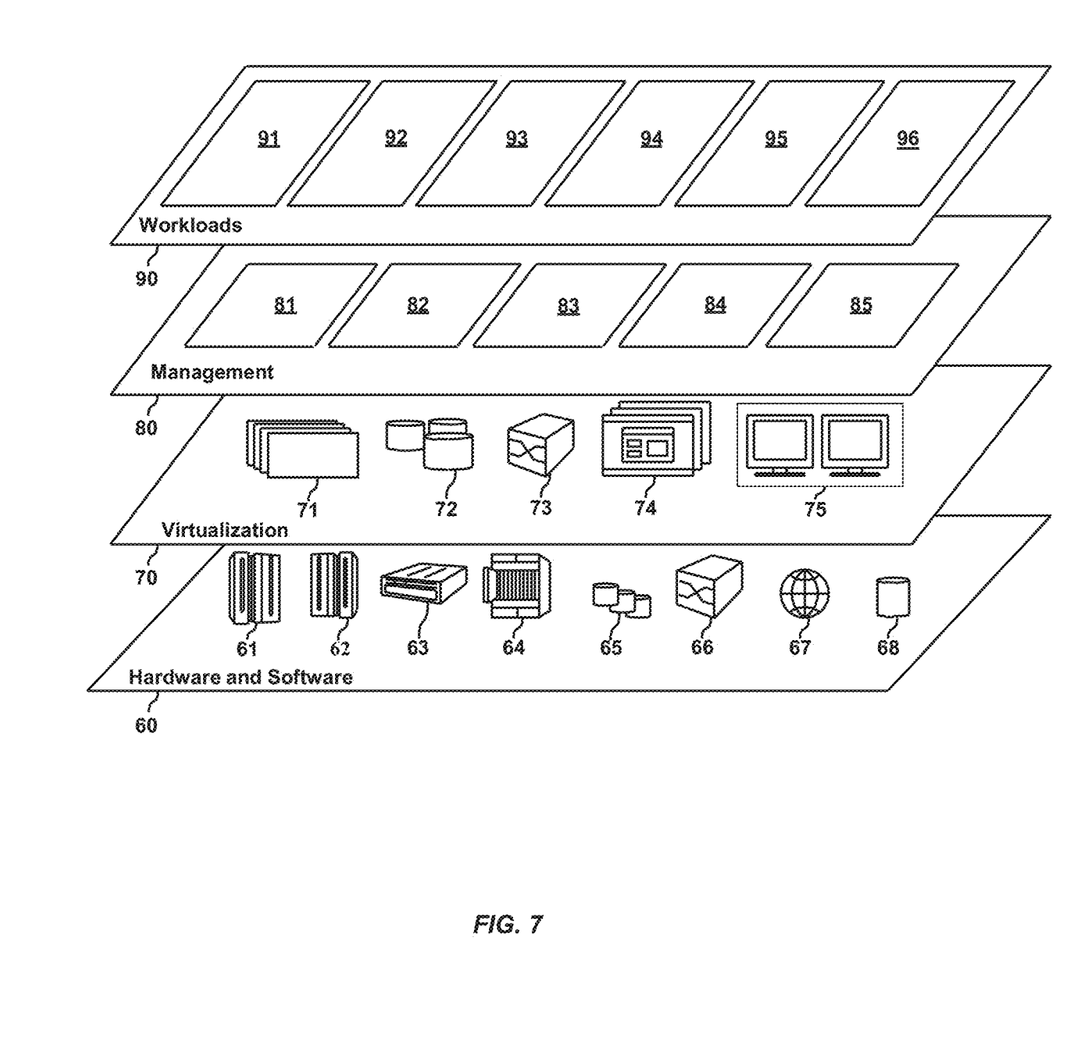
FIG. 7 depicts abstraction model layers, in accordance with an embodiment of the invention.

Referring now to FIG. 7 a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A method for automatically applying one or more software patches to software associated with container images based upon image relationships in a dependency tree, the method comprising:
   determining by a computing device whether software associated with a base container image requires one or more software patches;
   accessing by the computing device one or more dependency trees maintaining image relationships between the base container image and one or more dependent container images;
   determining by the computing device based upon the accessed one or more dependency trees whether the base container image has one or more dependent container images derived from the base container image;
   checking whether the one or more software patches the base container image requires are compatible with the one or more dependent container images, when checking for compatibility the computing device checks whether the one or more software patches are compatible in a patch coverage table;
   applying by the computing device the one or more software patches to the software associated with the base container image;
   rebuilding by the computing device the base container image with the applied one or more software patches; and
   rebuilding by the computing device one or more dependent container images dependent upon the rebuilt base container image.

2. The method of claim 1, wherein rebuilding by the computing device the one or more dependent container images comprises determining by the computing device whether a pre-stored container image compatible with the rebuilt base container image exists in an image repository and, if so, rebuilding the one or more dependent container images using the pre-stored container image.

3. The method of claim 1, wherein rebuilding by the computing device the one or more dependent container images comprises determining by the computing device whether a pre-stored container image compatible with the rebuilt base container image exists in an image repository and, if not, rebuilding the one or more dependent container images by building a new image.

4. The method of claim 1, wherein if rebuilding by the computing device one or more dependent container images fails, restoring the original one or more dependent container images and issuing a warning to prevent a similar issue from occurring.

5. The method of claim 4, further comprising after restoring the original one or more dependent container images updating the patch coverage table indicating the one or more software patches are incompatible with one or more previous software patches.

6. The method of claim 1, wherein the one or more software patches are security patches.

7. The method of claim 6, further comprising when rebuilding by the computing device the container image with the one or more security software patches, tagging the rebuilt image with a mandatory update tag and an update reason tag.

8. The method of claim 1, further comprising before applying by the computing device the one or more software patches to the base container image, checking via the patch coverage table whether a symbiotic patch is also necessary.

9. The method of claim 8, further comprising before applying by the computing device the one or more software patches to the base container image, applying by the computing device the symbiotic patch.

10. The method of claim 1, further comprising before applying by the computing device the one or more software patches to the base container image, checking via the patch coverage table whether one or more incompatible patches were previously installed.

11. The method of claim 1, wherein one or more of the rebuilt dependent container images are deployed in one or more containers, the one or more containers allowing read-write access but the container image allowing only read-only access.

12. A computer system for automatic application of one or more software patches to software associated container images based upon image relationships in a dependency tree, the computer system comprising:
   one or more computer processors;
   one or more computer-readable storage media;
   program instructions stored on the computer-readable storage media for execution by at least one of the one or more processors, the program instructions comprising:

program instructions to determine by a computing device whether software associated with a base container image requires one or more software patches;
program instructions to access by the computing device one or more dependency trees maintaining image relationships between the base container image and one or more dependent container images;
program instructions to determine by the computing device based upon the accessed one or more dependency trees whether the base container image has one or more dependent container images derived from the base container image;
program instructions to check whether the one or more software patches the base container image requires are compatible with the one or more dependent container images, the program instructions when checking for compatibility check whether the one or more software patches are compatible in a patch coverage table;
program instructions to apply by the computing device the one or more software patches to the software associated with the base container image;
program instructions to rebuild by the computing device the base container image with the applied one or more software patches; and
program instructions to rebuild by the computing device one or more dependent container images dependent upon the rebuilt base container image.

13. The computer system of claim 12, wherein the program instructions to rebuild one or more dependent container images restores an original one of the one or more dependent container images if rebuilding of the one or more dependent container images fails and issues a warning to prevent a similar issue from occurring.

14. The computer system of claim 13, wherein the program instructions to rebuild one or more dependent container images update the patch coverage table to indicate that one or more software patches are incompatible with one or more previous software patches if rebuilding of the one or more dependent container images fails.

15. The computer system of claim 12, wherein one or more of the rebuilt dependent container images are deployed in one or more containers, the one or more containers allowing read-write access but the container image allowing only read-only access.

16. A computer program product using a computing device to automatically apply one or more software patches to software associated with container images based upon image relationships in a dependency tree, the computer program product comprising:
one or more non-transitory computer-readable storage media and program instructions stored on the one or more non-transitory computer-readable storage media, the program instructions, when executed by the computing device, cause the computing device to perform a method comprising:
determining by a computing device whether software associated with a base container image requires one or more software patches;
accessing by the computing device one or more dependency trees maintaining image relationships between the base container image and one or more dependent container images;
determining by the computing device based upon the accessed one or more dependency trees whether the base container image has one or more dependent container images derived from the base container image;
checking whether the one or more software patches the base container image requires are compatible with the one or more dependent container images, when checking for compatibility the computing device checks whether the one or more software patches are compatible in a patch coverage table;
applying by the computing device the one or more software patches to the software associated with the base container image;
rebuilding by the computing device the base container image with the applied one or more software patches; and
rebuilding by the computing device one or more dependent container images dependent upon the rebuilt base container image.

* * * * *